United States Patent [19]

Stenudd

[11] 4,110,884

[45] Sep. 5, 1978

[54] METHOD FOR MAKING DUST COVER FOR PRINTING NEEDLES

[75] Inventor: Sven Gunnar Valter Stenudd, Lidingo, Sweden

[73] Assignee: Facit Aktiebolag, Atvidaberg, Sweden

[21] Appl. No.: 789,803

[22] Filed: Apr. 22, 1977

[30] Foreign Application Priority Data

Apr. 23, 1976 [SE] Sweden ................................ 7604708

[51] Int. Cl.[2] ................................................ B23P 15/16

[52] U.S. Cl. ................................. 29/163.5 R; 29/432; 29/445; 400/124; 29/163.5 R;432;434;445

[58] Field of Search ......................... 197/1 R; 156/293

[56] References Cited

U.S. PATENT DOCUMENTS

| | | | |
|---|---|---|---|
| 2,452,211 | 10/1948 | Rosenthal | 83/575 X |
| 3,833,105 | 9/1974 | Howard | 197/1 R |
| 3,893,220 | 7/1975 | Bittner | 197/1 R X |
| 3,921,277 | 11/1975 | Tramposch | 156/293 X |
| 3,991,871 | 11/1976 | McIntosh | 197/1 R |
| 4,016,965 | 4/1977 | Wirth et al. | 197/1 R |

FOREIGN PATENT DOCUMENTS

| | | | |
|---|---|---|---|
| 2,119,134 | 11/1972 | Fed. Rep. of Germany | 197/1 R |
| 2,506,562 | 9/1975 | Fed. Rep. of Germany | 197/1 R |

*Primary Examiner*—Paul T. Sewell
*Attorney, Agent, or Firm*—Alfred E. Miller

[57] ABSTRACT

A protective dust cover for the needles of a mosaic printing head which eliminates the need for precision matching of segments that fit together to form holes for accepting printing needles passing therethrough. There is no precise arrangement of the parts of a dust cover to furnish an effective printing needle dust cover.

5 Claims, 3 Drawing Figures

METHOD FOR MAKING DUST COVER FOR PRINTING NEEDLES

BACKGROUND OF THE INVENTION

The problem of preventing the accumulation of dust and dirt particles reaching the interior of a printing head through the openings in the head for a plurality of print needles has been dealt with by various means. In one method, such as set forth in U.S. Pat. No. 3,833,105, includes the covering of the opening with a two-part plate. Each of the parts has a number of semi-circular grooves which together form circular holes when the circular grooves are matched. It should be apparent that the matching of the parts of the plates requires high precision. Furthermore, in published German patent application No. 2,119,134 a plate is disclosed that functions as a dust cover and which is provided with a number of holes and is placed over the openings for the printing needles. Although this method does not require the fitting of different parts of a plate together, it is apparent that there is considerable requirement for the precision assembly of the cover.

The present invention relates to a method of providing a mosaic type printing head with printing needles and having a dust-proof cover at the opening in the device for the printing needles.

It is an object of the present invention to eliminate the precision requirements of known dust-proof covers or dust protective arrangements for printing needles.

It is another object of the present invention to provide a dust-proof cover for printing needles of a printing head in which the opening for the printing needles is covered with a relatively thin layer of a suitable material and thereafter the printing needles are activated repeatedly to punch holes in the thin layer. It is another object of the present invention to mold the thin layer and its adjoining parts surrounding the opening for the printing needles together, said layer and adjoining wall area being constituted of the same material.

It is another object of the present invention to provide a layer of material in the opening which is different from the material of the adjoining parts and wherein the layer of material is held in the grooves in the edges of said opening.

In order that the invention will be more clearly understood, it will now be disclosed in greater detail with reference to the accompanying drawings, in which.

DESCRIPTION OF THE PREFERRED EMBODIMENT

Figure 1:
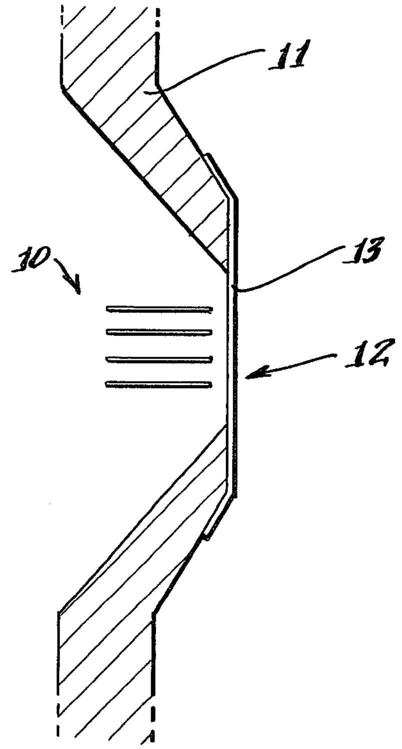
FIG. 1 is a diagrammatic sectional view showing a dust-proof cover for printing needles of a mosaic printing head in accordance with the teachings of my invention.

Referring to FIG. 1, the printing needles of a printing head of the mosaic type is shown with the reference numeral 10 pointing to the front ends thereof. The front wall 11 is shown of the printing head having an opening through which the needles are adapted to penetrate from the printing head. In order to protect the printing needles 10 from dust and dirt particles, it is desired to cover the opening 12, and the adjoining wall parts of the opening 12, with a thin layer 13 of a suitable selected material, such as aluminum, stainless steel, Mylar, or polytetrafluoroethylene tape. The thin layer 13 is secured to adjacent parts of the wall 11 adjoining the opening 12 by any suitable means, such as gluing, soldering, or self-adhesion. After the layer 13 is affixed in position, the activating mechanism of the needles are energized repeatedly causing the needles to wear through the layer 13 after a considerable number of strokes of the needles 10 thus producing a number of spaced but well-defined holes.

It should be observed that the present method eliminates precision problems associated with known methods, and since the needles 10 are of sufficient strength and durability they themselves make the holes with tolerances that will be considerably better than what has been possible heretofore. In this connection, it should be noted that the tolerance will be best if plastic or elastic material is used, since the holes in that case will be slightly smaller than the needle diameter due to the stretching of the material during the hole producing process.

Figure 2:
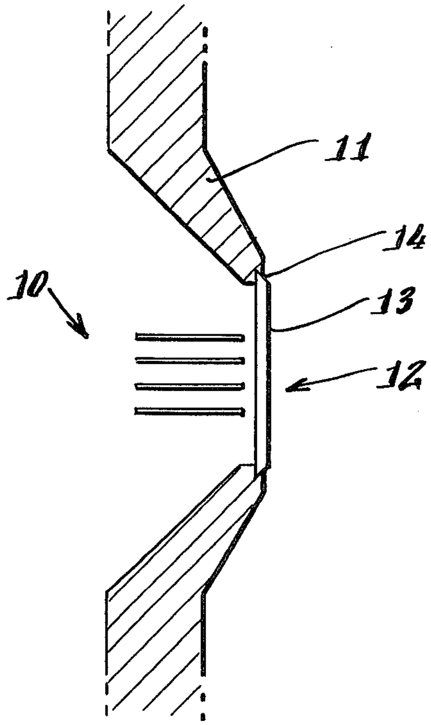
FIG. 2 is a diagrammatic sectional view of another embodiment of the invention.
Figure 3:
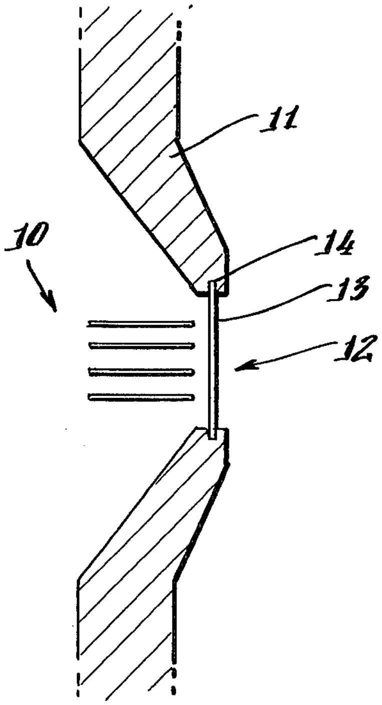
FIG. 3 is a diagrammatic sectional view of still another embodiment of the present invention.

Referring to FIG. 1, the layer 13 comprises a piece of material being considerably larger than the opening 12, however, it is also possible to use a piece of material having about the same dimensions as the opening. This latter condition is illustrated in FIGS. 2 and 3 in which identical reference numerals as in FIG. 1 are used for corresponding details. In FIGS. 2 and 3 the layer 13 consists of a plate fixed by suitably formed grooves 14 in the border of the opening 12. In this case, plate 13 may either consist of an insert which is pushed or snapped into place or be formed molding a material, such as polytetrafluoroethylene, and which is different from the material of the wall 11 in the opening 12.

The method of the present invention is further simplified if the plate 13 is not applied separately but consists of a thin layer molded at the same time as the wall 11 is molded. In this case, the thickness of the layer is preferably 0.1–0.2 mm and the material is either aluminum or zinc.

What is claimed is:

1. A method of providing a dust proof cover for printing needles of a mosaic printing head having an opening comprising: placing a thin layer of a selected suitable material over the opening of the printing head for said printing needles, and repeatedly moving each of said printing needles into engagement with said thin layer of material to wear holes therein through which said printing needles can pass.

2. The method as claimed in claim 1 wherein said layer is stainless steel which is placed over said opening and attached to adjacent parts of said print head.

3. The method as claimed in claim 1 wherein said layer is a Mylar tape that is stretched over said opening.

4. The method as claimed in claim 1 wherein said layer is a polytetrafluoroethylene tape that is stretched over said opening.

5. The method as claimed in claim 1 wherein said thin layer and adjacent parts of said print head are constituted of the same material, said layer being formed by being molded together with said adjacent parts.

* * * * *